C. PEARSON.
HAY RAKE.
APPLICATION FILED MAR. 2, 1914.
1,250,347.
Patented Dec. 18, 1917.
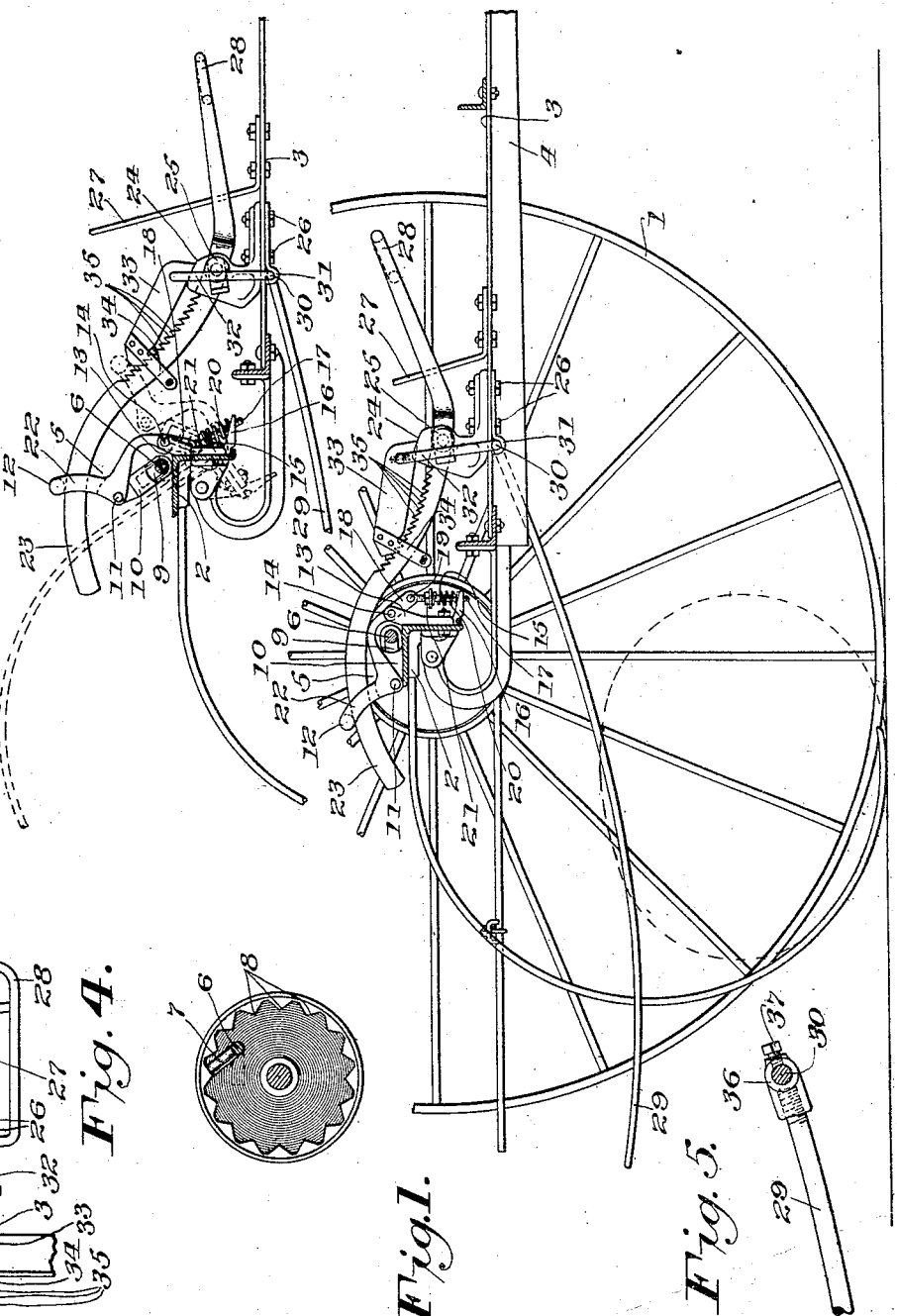

UNITED STATES PATENT OFFICE.

CHARLES PEARSON, OF CHICAGO, ILLINOIS, ASSIGNOR TO INTERNATIONAL HARVESTER COMPANY OF NEW JERSEY, A CORPORATION OF NEW JERSEY.

HAY-RAKE.

1,250,347.         Specification of Letters Patent.         Patented Dec. 18, 1917.

Application filed March 2, 1914. Serial No. 822,011.

*To all whom it may concern:*

Be it known that I, CHARLES PEARSON, a citizen of the United States, residing at Chicago, in the county of Cook and State of Illinois, have invented certain new and useful Improvements in Hay-Rakes, of which the following is a full, clear, and exact specification.

My invention relates to hay rakes of the draft dumping type, wherein a rake tooth carrying head is caused to intermittently engage with the carrying wheels at the will of the operator in a manner to swing the rake teeth in a vertical plane above the accumulated load and permit it to be discharged in windrows upon the ground. Heretofore, in the operation of rakes of the type indicated, the teeth have been raised to a predetermined height in order to discharge the load, regardless of its size or height from the ground, and then the clutch mechanism, connecting the rake tooth carrying head with the traction wheels, was automatically released and the teeth permitted, by gravity, to swing to an operative position on the ground. As a result of this mode of operation, with the rake propelled rapidly over the ground, the teeth would fail to reach an operative position until the rake had passed so far beyond the discharged load as to leave more or less hay in front of the windrow unengaged by the teeth.

The object of this invention is to provide means whereby the disengagement of the rake clutch mechanism is controlled by the size of the load that is dumped in such a manner that while the rake teeth will swing up to clear a windrow of any size, they will always return promptly to engagement with the ground after clearing the same and thereby rake the hay close to the windrow and increase the efficiency of the rake and its operation.

These objects are attained by means of mechanism, one embodiment of which is illustrated in the accompanying drawing as applied to a rake substantially like that shown in my Patent No. 1,000,438, issued August 15, 1911.

Figure 1 is a sectional end elevation of part of a hay rake having my invention embodied in its construction;

Fig. 2 is a top plan view of part of Fig. 1, illustrating the application of my invention to a hay rake;

Fig. 3 is a side elevation of part of Fig. 1, designed to illustrate the operation of my invention;

Fig. 4 is a detail view of the wheel clutch mechanism;

Fig. 5 is a detail view of one of the adjusting means for the trip rod.

Referring to the drawings, wherein the same reference characters designate like parts throughout the several views, 1 represents one of the carrying wheels journaled upon an axle secured to a tooth carrying head 2, that is adapted to rock in a common way about the axis of the carrying wheels to dump an accumulated load, 3 a draft frame pivotally connected with the head, 4 thills secured to the lower side of the draft frame, 5 a toggle link connection between the draft frame and the rake head, while 6 represents a pivoted rock shaft carrying clutch engaging members 7 at its opposite ends that are adapted to engage the ratchets 8 upon the carrying wheels in a common way, as, for instance, that shown in my patent mentioned, when the rock shaft is turned in a direction to dump a load. The inner ends of these clutch engaging members are turned laterally relative to the axis of the shaft, forming adjacent arms 9 that are received by socket members 10 provided with transverse openings at their rear ends adapted to receive a cross pin 11 that connects them with the rear end of a lever 12. This lever 12 is preferably formed integral with the upper member of the toggle 5 and is pivotally connected, near its forward end, with a bracket 13 by means of a pin 14, the bracket being secured to the front leg of the rake head by means of bolts 15. 16 represents a forwardly extending ear member preferably integral with the lower end of the bracket 13 and provided with a vertically disposed opening that receives the lower end of a slidable threaded link 17, having its opposite end pivotally connected with a forwardly and downwardly extending end 18 of the lever 12 by means of a pin 19, a compression spring 20 encircling the link and operative between the ear member 16 and a pressure adjusting nut 21 carried by the link and operating in a manner to yieldingly hold the lever 12 in one position of its operation with the rake teeth in raking position, as shown in Fig. 1, and when the lever is moved in an opposite direction, to the full line position shown in Fig. 3, operating to swing the link rearwardly in a manner to lock it in its clutch tripping position when it is desired to dump the accumulated load gathered by the rake teeth. The lever 12 is provided at its rear end with a loop 22 that slidably receives the rear end of a clutch tripping bar 23, that curves forward and downward substantially concentric with the axis of movement of the rake head, and is pivotally connected with a bracket 24 by means of a pin 25, the bracket being secured to the draft frame by means of bolts 26. As shown, this bar 23 is preferably bent laterally forward of its pivotal connection in order that it may extend in front of the seat supporting frame 27, and is provided with an arm 28 at its front end within convenient reach of the operator's foot in order that it may be readily manipulated. When the operator presses downward upon the arm 28 the tripping lever or bar 23 at its rear end swings the lever 12 into the position shown in full lines in Fig. 3, which causes the rock shaft 6 to turn in its bearings in a manner to shift the clutch engaging members 7 into engagement with the ratchets 8 upon the traction wheels and cause the rake head to turn about its axis to dump a load in a well-known manner. As the head rocks forward the loop portion of the lever 12 slides forward upon the tripping bar 23, following its curvature until it contacts with a throw-out that operates to reverse the position of the lever and release the clutch mechanism.

In my patent, as noted, when the loop of lever 12 reached the front end of the curved part of the tripping bar 23 and engaged with the relatively horizontally extending member, its movement forward was arrested and a further angular movement of the rake head in a forward direction would cause the lever 12 to disengage the clutch mechanism and permit the rake head to turn in an opposite direction and carry the teeth to an operative position upon the ground. In dumping the load the points of the teeth were always carried to a fixed height, determined by the position of the throw-out element within the path of the member controlling the operation of the clutch mechanism. I am aware that means have been provided before my invention whereby the throw-out element might be adjusted in a manner to control the degree of angular movement of the rake head in a load dumping direction, but such adjustment was more or less permanent in its character and manually controlled. My present invention includes means automatically operative to adjust the throw-out element according to the height that is necessary to raise the points of the rake teeth above the ground to clear loads having variable dimensions without any manipulation on the part of the operator. I have provided mechanism whereby this result is attained, including a rod 29 centrally arranged in the line of draft of the machine, having its front end turned transversely, forming a journal portion 30 that is adapted to rock in a fixed bearing member 31 secured to the draft frame, the rearwardly extending body of the rod curving upward and projecting in rear of the rake teeth in the path of the windrow. The journal portion 30 of the rod extends beyond the bearing member 31, and 32 represents an upturned arm thereon, having its upper end turned transversely and pivotally received by an opening in the front end of a longitudinally extending throw-out member 33, disposed above the tripping bar 23 and parallel therewith, and having secured to its rear end a loop member 34 that slidably receives the bar 23 and permits an upward swing of the member 33 about its axis to a limited extent. The bar 23 is provided with a series of teeth 35 upon its upper edge that are adapted to engage with other teeth upon the lower side of the rear end of the throw-out member 33, the angle of the coacting teeth being such, and the front end of the member 33 being carried high enough above the arm 23 to cause the toothed portion of the member 33 to ride over the teeth upon the bar 23 when the member 33 is drawn forward or pushed rearward by a swinging movement of the arm 32 as the body of the rod 29 moves upward or downward.

In the operation of the mechanism, when the lever 12 moves forward upon the bar 23 and the accumulated load is being dumped, its movement is arrested by contact with the rear end of the throw-out member 33, and its direction of movement is such as to prevent the coacting teeth upon the bar and throw-out member from becoming disengaged. Thus the throw-out member 33 is in effect held rigid and operates with the associated parts of the mechanism to disengage the clutch mechanism and permit the rake teeth to fall to an operative position upon the ground; the position of the throw-out member 33 upon the bar 23 determining the effective height to which the points of the teeth are raised in dumping the load, and such position being controlled by an upward swing of the rod 29 as it rides over the load of hay being dumped. In other words, the upward swing of the rake teeth is so controlled automatically that the same moves upward just enough to clear the windrow, whatever the size of the latter, and after they have passed over the windrow, are permitted to drop down in such a manner as to engage the ground close to the front of the windrow and to insure efficient raking. Obviously, to adapt the mechanism shown to use in connection with different teams; as, for instance, to teams walking at different speeds, the rod 29 may be made adjustable with respect to the throw-out member 33 in such a manner as to vary the amount by which the teeth clear the windrow. This may be accomplished, if desired, by bending the rod at different angles with respect to the ground, or by providing an adjustable connection between the latter and the journal portion 30, as shown in Fig. 5, a collar 36, having the front end of the rod 29 seated therein, being adjustably mounted on the portion 30 as shown, and held in any position by a set screw 37.

Having illustrated and described an embodiment of my invention, I do not wish that it be confined to the details of construction as shown; it being understood that many changes may be made in the structure without departing from the spirit of my invention.

What I claim as my invention, and desire to secure by Letters Patent, is:

1. In a draft dump hay rake, rake teeth operative to gather a load, dumping mechanism for vertically moving said teeth to dumping position, and means controlled by the size of the load for determining the extent of vertical dumping movement of said teeth.

2. In a draft dump hay rake, rake teeth, dumping mechanism, and means controlled by the quantity of raked hay to form a windrow for determining the extent of dumping movement of said teeth.

3. In a hay rake, draft operated raking and dumping mechanism, and means for adjusting the extent of movement of said raking mechanism in accordance with the size of a mass of hay to be formed into a windrow.

4. In a hay rake, rake teeth operative to gather a load and movable in a vertical plane to dumping position, and means controlled by the load for limiting the dumping movement of said teeth.

5. In a hay rake, rake teeth operative to gather a load and movable in a vertical plane to dumping position, and means for determining the extent of movement of said teeth, said means being controlled by a limiting element coacting with the load.

6. In a draft dump hay rake, rake teeth operative to gather a load, dumping mechanism for vertically moving said teeth to dumping position, means controlled by the size of the load for determining the extent of vertical dumping movement of said teeth, and means for adjusting said controlling means.

7. In a draft dump hay rake, raking members, power operated means for raising said members to dump their load, and means controlled by the height of the load for releasing said members from said raising means.

8. In a draft dump hay rake, rake teeth operative to gather a load and movable in a vertical plane to dumping position, means for raising said teeth to variable heights, the effective height being gaged by a limiting element riding over the load.

9. In a draft dump hay rake, a draft frame, a rocking head connected with said draft frame, rake teeth carried by said rocking head, traction wheels carrying said head, clutch mechanism for operatively connecting said head with said wheels to rock said head in a direction to dump a load, means for tripping said clutch mechanism into action, and means operative to disengage said clutch mechanism, said clutch disengaging means including a member engaging with the accumulated load and operative to control the degree of angular movement of said head in a dumping direction.

10. In a draft dump hay rake, a draft frame, a rocking head connected with said draft frame, rake teeth carried by said rocking head, traction wheels carrying said head, clutch mechanism for operatively connecting said head with said wheels to rock said head in a direction to dump the load, means for tripping said clutch mechanism into action, and means operative to disengage said clutch mechanism, said clutch disengaging means including a vertically swinging member riding over an accumulated load and thereby automatically controlling the position of the clutch disengaging means relative to the degree of angular movement of said head.

11. In a draft dump hay rake, a draft frame, a rocking head connected with said draft frame, rake teeth carried by said rocking head, traction wheels carrying said head, clutch mechanism for operatively connecting said head with said wheels to rock said head in a direction to dump a load, said clutch mechanism including a rocking element carried by said head, means for rocking said element in a direction to trip said clutch mechanism into engagement, a clutch throw-out element carried by said draft frame and operative to engage said rocking element in a direction to disengage said clutch mechanism at varying degrees of the angular movement of said head, and means operative with the rake for automatically controlling the position of said throw-out element relative to said clutch controlling rocking element.

12. In a draft dump hay rake, a draft frame, a rocking head connected with said draft frame, rake teeth carried by said rocking head, traction wheels carrying said head, clutch mechanism for operatively connecting said head with said wheels to rock said head in a direction to dump a load, said clutch mechanism including a rocking element carried by said head and having a radially extending arm, a tripping lever engaging with said arm in a manner to actuate it in a direction to cause an engagement with said clutch mechanism, a clutch throw-out element carried by said tripping lever and engageable with said arm to turn it in a direction to disengage said clutch mechanism at varying degrees of angular movement of said head, and means operative with the rake for automatically adjusting the position of said throw-out element upon said tripping lever.

13. In a draft dump hay rake, a draft frame, a rocking head connected with said draft frame, rake teeth carried by said rocking head, traction wheels carrying said head, clutch mechanism for operatively connecting said head with said wheels to rock said head in a direction to dump the load, said clutch mechanism including a rocking element carried by said head, means for rocking said element in a direction to shift said clutch mechanism into engagement, a clutch throw-out element carried by said draft frame and engageable with said rocking element to turn it in a direction to disengage said clutch mechanism at varying degrees of the angular movement of said head, and a trailing member carried by said draft frame and engaging with an accumulated load in a manner to automatically control the position of said throw-out element relative to said clutch controlling rocking element.

14. In a draft dump hay rake, a draft frame, a rocking head connected with said said draft frame, rake teeth carried by said rocking head, traction wheels carrying said head, clutch mechanism for operatively connecting said head with said wheels to rock said head in a direction to dump a load, said clutch mechanism including a rocking element carried by said head and having a radially extending arm, a tripping lever engageable with said arm to cause an engagement of said clutch mechanism, a clutch throw-out element slidably mounted upon said tripping lever and engageable with said arm to turn it in a direction to disengage said clutch mechanism at varying degrees of an angular movement of said head, and a trailing member pivotally connected with said frame and said throw-out element and engageable with an accumulated load in a manner to automatically adjust the position of said throw-out upon said tripping lever.

15. In a draft dump hay rake, a draft frame, a rocking head connected with said draft frame, rake teeth carried by said rocking head, traction wheels carrying said head, clutch mechanism for operatively connecting said head with said wheels to rock said head in a direction to dump a load, said clutch mechanism including a rocking element carried by said head and having a radially extending arm, a tripping lever engageable with said arm to actuate it in a direction to cause an engagement of said clutch mechanism, a clutch throw-out element slidably mounted upon said tripping lever and engageable with said arm to turn it in a direction to disengage said clutch mechanism at varying degrees of an angular movement of said head, and a centrally disposed rod having its front end pivotally connected with the draft frame and provided with an upturned arm connected with said throw-out element, the opposite end of said rod extending over an accumulated load and being actuated thereby to automatically adjust the throw-out element along said tripping lever to a position determined by the height of the rod.

16. In a draft dump hay rake, a draft frame, a rocking head connected with said draft frame, rake teeth carried by said rocking head, traction wheels carrying said head, clutch mechanism for operatively connecting said head with said wheels to rock said head in a direction to dump a load, said clutch mechanism including a rocking element carried by said head and having a radially extending arm, a tripping lever engageable with said arm to actuate it in a direction to cause an engagement of said clutch mechanism, a clutch throw-out element having one end slidably mounted upon said tripping lever and automatically locked against movement thereon when engaged by said rocking element of the clutch mechanism, and means for automatically adjusting the position of said throw-out element, said means including a centrally disposed rod having its front end pivotally connected with the draft frame and provided with an upturned arm connected with said throw-out element, the opposite end of said rod extending above an accumulated load and actuated thereby.

17. In a draft dump hay rake, a draft frame, a rocking head connected with said draft frame, rake teeth carried by said rocking head, traction wheels carrying said head, clutch mechanism for operatively connecting said head with said wheels to rock said head in a direction to dump a load, said clutch mechanism including a rocking element carried by said head and having a radially extending arm, a tripping lever pivoted intermediate its ends upon said draft frame having its rear end substantially concentric with the axis of said head and slidably engaging with said radially extending arm and provided with a series of teeth upon its upper side, clutch throw-out mechanism including a member having one end provided with teeth engageable with the teeth upon said tripping lever, and a trailing rod pivoted upon the draft frame and having one end extending rearward engaging with the load of hay being accumulated and its opposite end pivotally connected with said toothed throw-out member.

In testimony whereof I affix my signature, in the presence of two witnesses.

CHARLES PEARSON.

Witnesses:
R. W. MARTIN,
RAY PATTISON.

Copies of this patent may be obtained for five cents each, by addressing the "Commissioner of Patents, Washington, D. C."